US012243020B2

United States Patent
Eyal Altman et al.

(10) Patent No.: US 12,243,020 B2
(45) Date of Patent: Mar. 4, 2025

(54) DETECTING FRAUD BY CALCULATING EMAIL ADDRESS PREFIX MEAN KEYBOARD DISTANCES USING MACHINE LEARNING OPTIMIZATION

(71) Applicant: Intuit Inc., Mountain View, CA (US)

(72) Inventors: Noah Eyal Altman, Rishon Le'zion (IL); Or Basson, Tel Aviv (IL); Yehezkel Shraga Resheff, Tel Aviv (IL); Yair Horesh, Kfar-Saba (IL)

(73) Assignee: Intuit Inc., Mountain View, CA (US)

( * ) Notice: Subject to any disclaimer, the term of this patent is extended or adjusted under 35 U.S.C. 154(b) by 1077 days.

(21) Appl. No.: 16/823,642

(22) Filed: Mar. 19, 2020

(65) Prior Publication Data

US 2021/0295179 A1 Sep. 23, 2021

(51) Int. Cl.
*G06Q 10/107* (2023.01)
*G06F 18/2135* (2023.01)
(Continued)

(52) U.S. Cl.
CPC ..... *G06Q 10/107* (2013.01); *G06F 18/21355* (2023.01); *G06N 5/04* (2013.01);
(Continued)

(58) Field of Classification Search
CPC ........ G06N 5/04; G06N 20/00; G06K 9/6248; G06Q 10/04; G06Q 10/107; G06Q 30/0185
(Continued)

(56) References Cited

U.S. PATENT DOCUMENTS

2014/0279739 A1* 9/2014 Elkington .............. G06N 20/00 706/12
2016/0335244 A1* 11/2016 Weisman .............. G06F 40/242
(Continued)

FOREIGN PATENT DOCUMENTS

CN 108874756 A * 11/2018

OTHER PUBLICATIONS

Piotr Switalski and Mateusz Kopowka. Machine Learning Methods in E-mail Spam Classification. Studia Informatica. Systems and Information Technology. Nr 1-2 (23). (Year: 2019).*
(Continued)

*Primary Examiner* — Virpi H Kanervo
(74) *Attorney, Agent, or Firm* — Paradice & Li LLP

(57) ABSTRACT

This disclosure relates to systems and methods for identifying fraudulent email addresses associated with an electronic payment service. In some implementations, a computing device receives an email with a prefix having a number of characters and characterized by a prefix length indicative of the number of characters in the prefix. The computing device identifies each of a number of bigrams is identified within the prefix, and determines a row and column distance for each bigram between two consecutive characters of the bigram as positioned on a keyboard. The computing device calculates a Euclidean distance between the two consecutive characters of the bigram based on the row and column distances, and determines a normalized distance based on the prefix length and an average of the Euclidean distances calculated for the number of bigrams in the prefix. The normalized distance is compared with a value to classify the email as suspicious or as not suspicious.

20 Claims, 10 Drawing Sheets

(51) Int. Cl.
  *G06N 5/04* (2023.01)
  *G06N 20/00* (2019.01)
  *G06Q 10/04* (2023.01)
  *G06Q 30/018* (2023.01)

(52) U.S. Cl.
  CPC ............. *G06N 20/00* (2019.01); *G06Q 10/04* (2013.01); *G06Q 30/0185* (2013.01)

(58) Field of Classification Search
  USPC .......................................................... 706/12
  See application file for complete search history.

(56) References Cited

U.S. PATENT DOCUMENTS

2016/0344770 A1* 11/2016 Verma ..................... H04L 51/42
2019/0362219 A1* 11/2019 Scheffler ................. G06N 3/04

OTHER PUBLICATIONS

B. R. Savaliya and C. G. Philip, "Email fraud detection by identifying email sender," 2017 International Conference on Energy, Communication, Data Analytics and Soft Computing (ICECDS), 2017, pp. 1420-1422. (Year: 2017).*

S. Afroz, M. Brennan and R. Greenstadt, "Detecting Hoaxes, Frauds, and Deception in Writing Style Online," 2012 IEEE Symposium on Security and Privacy, San Francisco, CA, USA, 2012, pp. 461-475. (Year: 2012).*

* cited by examiner

```
Classify the email as suspicious when the normalized
distance is less than the value. 626
```
⬍⬆
```
Classify the email as not suspicious when the normalized
distance is not less than the value. 628
```

```
For each bigram of the number of bigrams, assign an x-
coordinate and a y-coordinate to each of the two consecutive
characters in the bigram. 632
```

```
Calculate the row distance between the two consecutive
characters of a respective bigram based on a difference
between absolute values of the x-coordinates of the two
consecutive characters of the respective bigram. 642
```
⬍⬆
```
Calculate the column distance between the two consecutive
characters of the respective bigram based on a difference
between absolute values of the y-coordinates of the two
consecutive characters of the respective bigram. 644
```

Create a mapping between each of the characters in the prefix and a corresponding set of the x-coordinates and the y-coordinates. 652

Determine a weighted row distance by multiplying the row distance of the bigram by a first parameter. 662

Determine a weighted column distance by multiplying the column distance of the bigram by a second parameter, wherein the Euclidean distance of the bigram is based on the weighted row distance, the weighted column distance, and the prefix length. 664

Calculate the Euclidean distance by taking a square root of a distance value based on a sum of the weighted row distance squared and the weighted column distance squared. 672

Iteratively optimize the first and second parameters using a machine learning (ML) classification model. 682

Infer a fraud level of the email based at least in part on the first and second optimized parameters. 684

FIG. 6H

DETECTING FRAUD BY CALCULATING EMAIL ADDRESS PREFIX MEAN KEYBOARD DISTANCES USING MACHINE LEARNING OPTIMIZATION

TECHNICAL FIELD

This disclosure relates generally to detecting fraud associated with an electronic payment service, and more specifically, to identifying fraudulent email addresses associated with an electronic payment service.

DESCRIPTION OF RELATED ART

Creating an account for an electronic payment service may not require a new user to provide a valid email address. As a result, fraudulent parties (referred to as "fraudsters") can use fake email addresses to create synthetic email accounts that are not attributable to real users, and then use the fake email addresses to create fraudulent accounts with the electronic payment service. It would be desirable for an electronic payment service to quickly and accurately detect these fake email addresses, which in turn may lead to the identification of fraudulent accounts created in the electronic payment service.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods and devices of this disclosure each have several innovative aspects, no single one of which is solely responsible for the desirable attributes disclosed herein.

One innovative aspect of the subject matter described in this disclosure can be implemented as a method of identifying fraudulent email addresses associated with an electronic payment service. The method can be performed by one or more processors of a computing device and can include receiving an email including a prefix including a number of characters and characterized by a prefix length indicative of the number of characters in the prefix; identifying each of a number of bigrams within the prefix, each bigram of the number of bigrams consisting of two consecutive characters of the prefix; determining, for each bigram of the number of bigrams, a row distance and a column distance between the two consecutive characters of the bigram as positioned on a keyboard; calculating, for each bigram of the number of bigrams, a Euclidean distance between the two consecutive characters of the bigram based on the determined row and column distances; determining a normalized distance based on the prefix length and an average of the Euclidean distances calculated for the number of bigrams in the prefix; comparing the normalized distance with a value; and classifying the email as suspicious as not suspicious based at least in part on the comparing. In some implementations, classifying the email can include classifying the email as suspicious when the normalized distance is less than the value and classifying the email as not suspicious when the normalized distance is not less than the value.

In some implementations, for each bigram of the number of bigrams, an x-coordinate and a y-coordinate can be assigned to each of the two consecutive characters in the bigram. The row distance can be calculated between the two consecutive characters of a respective bigram based on a difference between absolute values of the x-coordinates of the two consecutive characters of the respective bigram; and the column distance can be calculated between the two consecutive characters of the respective bigram based on a difference between absolute values of the y-coordinates of the two consecutive characters of the respective bigram.

In some implementations, a mapping is created between each of the characters in the prefix and a corresponding set of the x-coordinates and the y-coordinates. In some aspects, a weighted row distance is determined by multiplying the row distance of the bigram by a first parameter; and a weighted column distance is determined by multiplying the column distance of the bigram by a second parameter, where the Euclidean distance of the bigram is based on the weighted row distance, the weighted column distance, and the prefix length. The Euclidean distance is calculated by taking a square root of a distance value based on a sum of the weighted row distance squared and the weighted column distance squared. In some implementations, the first and second parameters can be iteratively optimized using a machine learning (ML) classification model, and a fraud level can be inferred of the email based at least in part on the first and second optimized parameters. The ML classification model can be based on at least one of a decision tree or a logistic regression.

Another innovative aspect of the subject matter described in this disclosure can be implemented in a computing device for identifying fraudulent email addresses associated with an electronic payment service. In some implementations, the computing device includes one or more processors and a memory. The memory may be coupled to the one or more processors, and may store instructions that, when executed by the one or more processors, cause the computing device to perform a number of operations. In some implementations, the number of operations may include receiving an email including a prefix including a number of characters and characterized by a prefix length indicative of the number of characters in the prefix; identifying each of a number of bigrams within the prefix, each bigram of the number of bigrams consisting of two consecutive characters of the prefix; determining, for each bigram of the number of bigrams, a row distance and a column distance between two consecutive characters of the bigram as positioned on a keyboard; calculating, for each bigram of the number of bigrams, a Euclidean distance between the two consecutive characters of the bigram based on the determined row and column distances; determining a normalized distance based on the prefix length and an average of the Euclidean distances calculated for the number of bigrams in the prefix; comparing the normalized distance with a value; and classifying the email as suspicious or as not suspicious based at least in part on the comparing. In some implementations, classifying the email can include classifying the email as suspicious when the normalized distance is less than the value and classifying the email as not suspicious when the normalized distance is not less than the value.

In some implementations, for each bigram of the number of bigrams, an x-coordinate and a y-coordinate can be assigned to each of the two consecutive characters in the bigram. The row distance can be calculated between the two consecutive characters of a respective bigram based on a difference between absolute values of the x-coordinates of the two consecutive characters of the respective bigram; and the column distance can be calculated between the two consecutive characters of the respective bigram based on a difference between absolute values of the y-coordinates of the two consecutive characters of the respective bigram.

In some implementations, a mapping is created between each of the characters in the prefix and a corresponding set of the x-coordinates and the y-coordinates. In some aspects, a weighted row distance is determined by multiplying the row distance of the bigram by a first parameter; and a weighted column distance is determined by multiplying the column distance of the bigram by a second parameter, where the Euclidean distance of the bigram is based on the weighted row distance, the weighted column distance, and the prefix length. The Euclidean distance is calculated by taking a square root of a distance value based on a sum of the weighted row distance squared and the weighted column distance squared. In some implementations, the first and second parameters can be iteratively optimized using a machine learning (ML) classification model, and a fraud level can be inferred of the email based at least in part on the first and second optimized parameters. The ML classification model can be based on at least one of a decision tree or a logistic regression.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Implementations of the subject matter disclosed herein are illustrated by way of example and are not intended to be limited by the figures of the accompanying drawings. Like numbers reference like elements throughout the drawings and specification. Note that the relative dimensions of the following figures may not be drawn to scale.

FIG. 5 shows an example representation of a fraud detection system as encoded in Python programming language, according to some implementations.

FIGS. 6A-6H show illustrative flowcharts depicting example operations for identifying fraudulent email addresses associated with an electronic payment service, according to some implementations.

DETAILED DESCRIPTION

Figure 1:
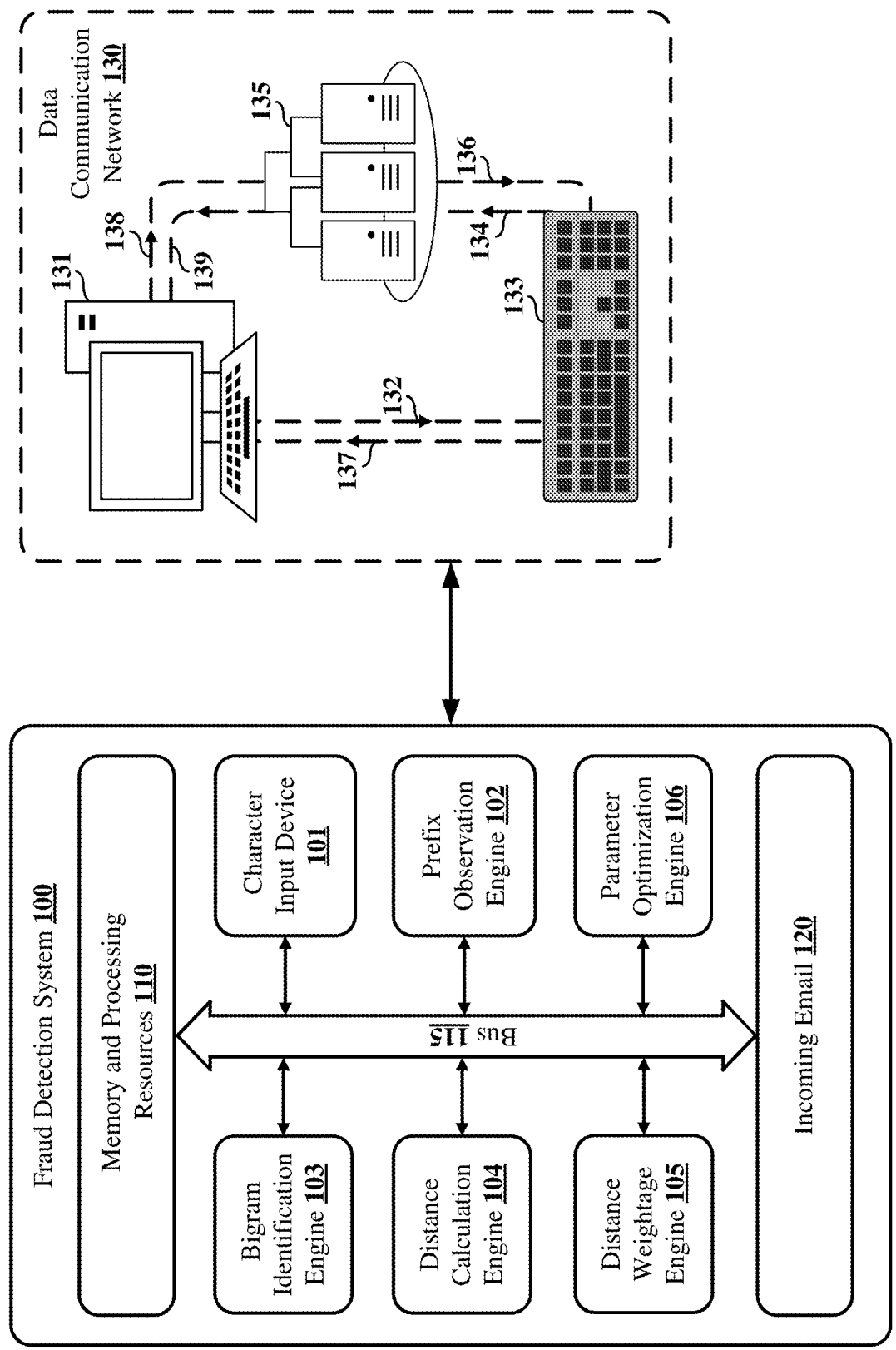
FIG. 1 shows a block diagram of a fraud detection system, according to some implementations.

Various implementations of the subject matter disclosed herein relate generally to a fraud detection system for identifying fraudulent email addresses associated with an electronic payment service. The fraud detection system can classify an email address as suspicious or not suspicious based on calculating keyboard distances between characters in a prefix of each email address as input into the fraud detection system (such as to access the electronic payment service). As used herein, the prefix of an email address refers to the alphanumeric characters of the email address that precede the "@" symbol. For example, the prefix of the email address "firstname.lastname@domain.com" is "firstname.lastname."

Some implementations more specifically relate to fraud detection systems that receive an email having a prefix of a certain length (referred to herein as the "prefix length"), and identify each of a number of bigrams within the prefix, for example, where each bigram consists of two consecutive characters of the email's prefix. In accordance with some aspects of the present disclosure, a fraud detection system can determine, for each bigram of the number of bigrams, a row distance (such as horizontally-oriented) and a column distance (such as vertically-oriented) between the two consecutive characters of the bigram as positioned on a keyboard. The determined row and column distances may be used to calculate, for each bigram of the number of bigrams, a Euclidean distance between the two consecutive characters of the bigram. The fraud detection system can determine a normalized distance based on the prefix length and an average of the Euclidean distances calculated for the number of bigrams in the prefix, and compare the normalized distance with a value to classify email as suspicious or as not suspicious based on the comparing. Email addresses identified or classified as suspicious can be flagged or blocked from further interacting with the electronic payment service, ultimately freeing up available memory and computer processing resources to enhance legitimate payment activity related service and performance. Additionally, large-scale attacks mounted by parties intending to harm or otherwise overwhelm the electronic payment service can be identified and blocked by detection and filtration of synthetic email addresses by the fraud detection system.

More specifically, in some aspects, the fraud detection system can classify the email as suspicious when the normalized distance is less than the value; and classify the email as not suspicious when the normalized distance is not less than the value (referring to being equal to or greater than the value). In some implementations, the fraud detection system can, for each bigram of the number of bigrams, assign an x-coordinate and a y-coordinate to each of the two consecutive characters in the bigram. For one example, the fraud detection system may calculate the row distance between the two consecutive characters of a respective bigram based on a difference between absolute values of the x-coordinates of the two consecutive characters of the respective bigram and calculate the column distance between the two consecutive characters of the respective bigram based on a difference between absolute values of the y-coordinates of the two consecutive characters of the respective bigram. The fraud detection system can create a (digital) mapping between each of the characters in the prefix and a corresponding set of the x-coordinates and the y-coordinates, for example, such that each character is assigned a corresponding (x,y) coordinate pair.

The fraud detection system can, for each bigram, determine a weighted row distance by multiplying the row distance of the bigram by a first parameter, and determine a weighted column distance by multiplying the column distance of the bigram by a second parameter, where the Euclidean distance of the bigram is based on the weighted row distance, the weighted column distance, and the prefix length. Determination of such weighted row and column distances can, in some implementations, assist the fraud detection system in differentiating between fraudulent and legitimate email addresses in view of letter, character or symbol clustering patterns observed in incoming fraudulent email addresses (such as a disproportionate clustering around a certain areas of the keyboard), and in response thereto apply weightages for filtering fraudulent email. That is, when a set of incoming fraudulent emails exhibits high character concentration levels in the same row, the fraud detection system can multiply the row distance by a first parameter, for example, to adjust its contribution to the Euclidean distance and the normalized distance. Likewise, the first parameter can be alternatively diminished when patterns are observed around clustering in the column distances. Such flexibility offers infinite (but still quantifiable) tunability for any conceivable fraudulent email address scenario.

The Euclidean distance can be calculated by taking a square root of a distance value based on a sum of the weighted row distance squared and the weighted column distance squared. In some implementations, the fraud detection system can iteratively optimize the first and second parameters using a machine learning (ML) classification model to infer a fraud level of the email based at least in part on the first and second optimized parameters. In some aspects, the fraud detection system can infer a fraud level of the email based at least in part on the first and second optimized parameters. The ML classification model may refer to any known tool obtained from, for example, open source libraries including TensorFlow, PredictionIO, DeepLearning4J, etc., as well as every cloud provider from Amazon, IBM, Microsoft, etc., which can draw some conclusion from observed data values such that, given one or more inputs, the classification model will predict or optimize the data values for one or more target outcomes). The ML classification model can be based on at least one of a decision tree or a logistic regression.

Various implementations of the subject matter disclosed herein provide one or more technical solutions to the technical problem of determining whether or not an incoming email address is fraudulent by calculating keyboard distances between characters in a prefix of each email address. The characters may be mapped (and quantified accordingly) to a corresponding set of x-coordinates and y-coordinates to determine weighted row and column distances by multiplying the row and column distances of the bigram by a first and second parameter, respectively. More specifically, various aspects of the present disclosure provide a unique computing solution to a unique computing problem that did not exist prior to the creation of synthetic (referring to computer-generated false email addresses that are not attributable to real users) use to launch hostile electronic or digital attacks on host web-based or computer servers, potentially disrupting data processing, dissemination or flow of the electronic payment service, much less computationally quantifying (and differentiating between) all email addresses incoming into an electronic payment service to identify fraudulent email addresses by calculating keyboard distances between characters in a prefix of each email address to classify the email as suspicious or not. As such, implementations of the subject matter disclosed herein are not an abstract idea and/or are not directed to an abstract idea such as organizing human activity or a mental process that can be performed in the human mind. Moreover, various aspects of the present disclosure effect an improvement in the technical field of fraudulent email detection and filtering by determining a weighted row distance by multiplying the row distance of the bigram by a first parameter and determining a weighted column distance by multiplying the column distance of the bigram by a second parameter, where the fraud detection system iteratively optimizes the first and second parameters using a machine learning (ML) classification model to infer a fraud level of the email based at least in part on the first and second optimized parameters. These functions cannot be performed in the human mind, much less using pen and paper.

In the following description, numerous specific details are set forth such as examples of specific components, circuits, and processes to provide a thorough understanding of the present disclosure. The term "coupled" as used herein means connected directly to or connected through one or more intervening components or circuits. The terms "processing system" and "processing device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing, and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory, and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may include random-access memory (RAM) such as synchronous dynamic random-access memory (SDRAM), read only memory (ROM), non-volatile random-access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits, and instructions described in connection with the implementations disclosed herein may be executed by one or more processors. The term "processor," as used herein may refer to any general-purpose processor, conventional processor, controller, microcontroller, and/or state machine capable of executing scripts or instructions of one or more software programs stored in memory.

FIG. 1 shows a block diagram of a fraud detection system 100, according to some implementations. The fraud detection system 100 may include a character input device 101 (such as an actual or virtual keyboard), a prefix observation engine 102, a bigram identification engine 103, a distance calculation engine 104, a distance weightage engine 105, a parameter optimization engine 106, memory and processing resources 110, and incoming email 120 (which may include one or more synthetic and/or legitimate email addresses). In some implementations, the various engines and components of the fraud detection system 100 can be interconnected by at least a data bus 115, as depicted in the example of FIG. 1. In other implementations, the various engines and components of the fraud detection system 100 can be interconnected using other suitable signal routing resources. The fraud detection system 100 can be implemented using any suitable combination of software and hardware.

The fraud detection system 100 may be associated with a data communication network 130 including at least a client 131 (such as a personal or business computer set-up), a keyboard 133, and server 135. The keyboard 133 may be one type of the character input device 101 associated with the fraud detection system 100. The data communication network 130 may be localized, such as a local area network (LAN), or wireless local area network (WLAN), and may include or involve any suitable data transmission technologies including Wi-Fi® or LTE and/or may be widespread and global, such as the Internet. Data for email communications can be transmitted or otherwise electronically forwarded on or along any one or more of representative data transmission pathways 137, 132 and/or 134, 136 and/or 138, 139 connecting each the client 131, the keyboard 133, and the server 135 (as well as other potential electronic or computer-based components or equipment integrated with the data communication network 130 not shown for simplicity). The data communication network 130 can, in some implementations, be the Internet, permitting for authentic (such as live human users) input of email addresses into an electronic payment service for interaction. Such interaction may include (or be otherwise associated with) submission of federal, state, local, and/or municipal tax information representative of wage or salaried annual earnings, and/or may include passive incoming generated from investment holdings, including (but not limited to) stocks, bonds, funds, real estate and/or the like.

Online (Internet-based) fraud, especially in an email-related context, can pose a significant security concern to an electronic payment service by potentially exposing or compromising sensitive customer financial data, and complicating the successful submission of payments to appropriate payees or vendors. Fraudulent email users, entities, and/or the like (referred to herein in the collective as "fraudsters") may be any one or more of live persons, computational algorithms, and/or combinations thereof, creating artificial (referred to herein as "synthetic") email addresses that are not affiliated with or representative of a live person or user intending to legitimately use or interface with the electronic payment service.

Figure 4:
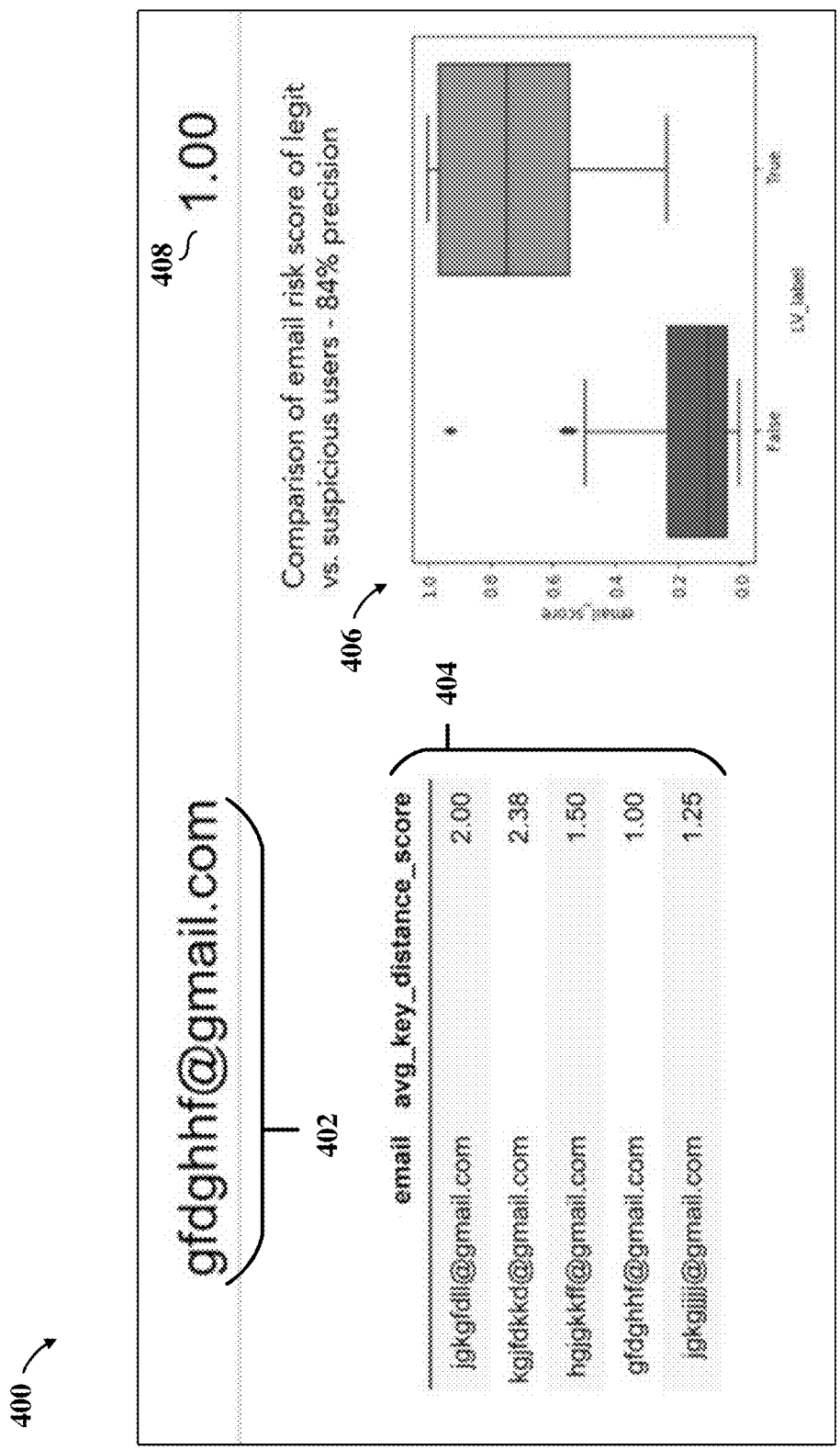
FIG. 4 shows an illustration depicting ascertaining the accuracy of determining fraudulent email addresses, according to some implementations.

Such synthetic email addresses are shown by an example synthetic email address 402 ("gfdghhf@gmail.com", with a prefix "gfdghhf") in FIG. 4, which includes various characters (letters) arranged in a nonsensical order that is unlike any real human name in any language. Synthetic emails may be automatically generated by nefarious computer programs that lack in depth, structure, or other capabilities necessary to duplicate legitimate-sounding human names. In practice, fraudsters may create (often in large quantities) such synthetic email addresses, each having a nonsensical prefix such as "gfdghhf", to attempt to enter and, in large volumes, ultimately overwhelm (by, for example, a "brute force" type digital attack) limited computational resources used by the electronic payment service, causing it to no longer function as intended (referred to as "crashing").

The fraud detection system 100 "observes" email addresses, including legitimate email addresses such as "john.doe@gmail.com," for differentiation from their unwanted and potentially dangerous synthetic counterparts, such as example synthetic email address 402. "Observation," as conducted or performed by the fraud detection system 100, generally refers to digitally detecting, extracting, and computationally manipulating, using computer-based processing resources, data associated with prefixes to classify email addresses input into an electronic payment service as suspicious (fraudulent) or as not suspicious.

Personal names typically consist of vowels interspersed between consonants, such as the "a" in "James", thus the complete spelling out of names requires keyboard characters that are spread out relative to each other (such as being somewhat uniformly dispersed) throughout various positions in a conventional "QWERTY" configuration keyboard. Synthetic emails, as discussed, are different from legitimate emails in that they (synthetic emails) tend to have a completely random assortment of characters, thus demonstrating a higher degree of clustering or concentration around certain portions or sections of a keyboard when compared to legitimate names (which show a higher degree of character dispersion due to the diverse locations of vowels on a "QWERTY" configuration keyboard).

Current electronic payment service providers may not be able to validate, in real-time (such as the moment in which an account is created with the electronic payment service provider), whether an email address is legitimate, therefore permitting for the unwanted entry of a synthetic email address. Fraudsters can overwhelm Internet-based electronic payment services, not only relying upon scripting-related attacks, but also by generating large quantities of synthetic emails. Comparison of keyboard distances between adjacent characters in a prefix of an email address allows for reliable differentiation between legitimate email addresses and synthetic email addresses in real-time to block such unwanted synthetic emails capable of overwhelming electronic payment service servers.

Returning to FIG. 1, character input device 101 can be any suitable device or peripheral that can enter alphanumeric and/or symbolic character-related information to any one or more of a user interface (UI) associated with a personal computer, network, server, database, etc. For example, the character input device 101 can be a keyboard featuring a traditional "QWERTY" letter or character layout (referred to as a "keyboard layout") such as that shown by any one or more of the client 131, the keyboard 133, and a keyboard 210 shown in FIG. 2, etc. In some implementations, the keyboard layout can refer to any specific mechanical, visual, or functional arrangement of the keys, legends, or key-meaning associations (respectively) of any one or more of a computer, typewriter, or other typographic keyboard. "Mechanical layout" can refer to the placements and/or physical keys of a keyboard. "Visual layout" can refer to the placement, orientation, and/or arrangement of legends (such as labels, markings, engravings) that appear on the individual keys of a keyboard. "Functional layout" can refer to the arrangement of key-meaning associations or keyboard mapping, determined in software, of all the individual keys of a given keyboard.

Many computer keyboards send one or more series of scan codes to an operating system (OS) rather than directly sending character-related information to it. From there, the series of scan codes can be converted into a "character stream" by keyboard layout software. Accordingly, a physical keyboard can dynamically map toward or with any number of layouts without switching hardware components. Rather, this can be accomplished by changing the software responsible for interpreting the keystrokes. In some aspects a user can change keyboard operation (such as for the keyboard 133), and use available third-party software to modify or extend keyboard functionality. Accordingly, the symbol shown on the physical key-top need not always be the same as what goes into a document being typed.

Although the keyboard 133 (as part of the fraud detection system 100) is described herein as a traditional "QWERTY" keyboard, used primarily for communications in American English, any number of additional (or alternative) keyboard layouts or configurations are possible (with corresponding mapping) for accommodating any number of languages, including those of which are not letter or script-based, such as pictographic languages (such as Mandarin Chinese, Japanese, and Korean, etc.). For example, various parameters associated with mapping character locations and keyboard layouts can be adjusted or altered (in software) to accommodate different language implementations as needed.

The prefix observation engine 102 can ascertain the prefix of the incoming email address 120 input into an electronic payment service provider operating on or over the data communication network 130 and process the incoming email address 120 to digitally extract the prefix from the total email address. For example, prefix observation engine 102 can observe, detect, separate, and/or extract the prefix "gfdghhf" from the example synthetic email address 402 ("gfdghhf@gmail.com") shown in FIG. 4 for separate processing or data manipulation. In some implementations, the prefix observation engine 102 can generate signals representative of the length, measured in characters, of the prefix, and define a prefix length. In the example discussed, a prefix length of seven (7) characters of the example synthetic email address 402 can be measured by the prefix observation engine 102 and correspond with the total number of characters in the prefix "gfdghhf" of the example synthetic email address 402. In some aspects, such information can be used in later data manipulation operations for characterizing a degree or extent of fraud as calculated by observing the dispersion (or degree of dispersion) of the keyboard characters by the prefix observation engine 102.

The bigram identification engine 103 can identify and segregate characters observed and extracted by the prefix observation engine 102 into multiple defined pairs or pairings referred to herein as "bigrams", with each bigram consisting of two consecutively positioned characters in the prefix of the email address. That is, for the example synthetic email address 402 having the prefix "gfdghhf", the bigram identification engine 103 can identify a total of six (6) bigrams: (1) "gf"; (2) "fd"; (3) "dg"; (4) "gh"; (5) "hh"; and, (6) "hf". Other prefixes may have more or fewer characters than the example synthetic email address 402; nevertheless, the bigram identification engine 103 can employ the same identification procedure and define any number of bigrams within the prefix of each incoming email address 120 into an electronic payment service.

In some implementations, the keyboard 133 can include mapping functionality (as described earlier) for attributing a defined position, represented by an (x,y) coordinate pair, to each and every character in the prefix. For the example synthetic email address 402 having the prefix "gfdghhf", a total of seven (7) characters can be mapped with (x,y) coordinate pair.

The distance calculation engine 104 can compute distances between each character in each bigram of the prefix based on the mapped locations of the characters as represented by their corresponding (x,y) coordinates. That is, the distance calculation engine 104 can calculate: (1) a row distance between two consecutive characters of a bigram based on a difference between absolute values of the x-coordinates of the two consecutive characters of the bigram as they appear on the keyboard 133; and (2) a column distance between the two consecutive characters of the bigram based on a difference between absolute values of the y-coordinates of the two consecutive characters of the bigram as they appear on the keyboard 133.

The distance weightage engine 105 can compute and/or otherwise determine: (1) a weighted row distance by multiplying the row distance of the bigram by a first parameter; and (2) a weighted column distance by multiplying the column distance of the bigram by a second parameter. In some implementations, a Euclidean distance of the bigram can be calculated based on the weighted row distance, the weighted column distance, and the prefix length. In some aspects, the Euclidean distance of each bigram can be calculated by taking a square root of a distance value based on a sum of the weighted row distance squared and the weighted column distance squared.

The parameter optimization engine 106 can iteratively optimize the first and second parameters using a machine learning (ML) classification model and infer a fraud level of the email address based at least in part on the first and second optimized parameters. Machine learning (ML) implies the scientific study of algorithms and statistical models that computer systems rely upon for performing a specific task without using explicit instructions, instead observing patterns and inference. ML is commonly viewed as a subset of artificial intelligence (AI). ML algorithms, such as those employed by the parameter optimization engine 106, can build a mathematical model based on sample data (taken from the incoming email address 120), known as "training data", and make predictions or decisions without being explicitly programmed for performing the task (of differentiating between legitimate and synthetic emails to efficiently filter out the synthetic email addresses).

ML algorithms can be configured for use in a wide variety of applications, such as email filtering for the fraud detection system 100, where it may otherwise be difficult or infeasible to develop a conventional algorithm for effectively performing the desired tasks. ML can be closely related with computational statistics, which focuses on making predictions using computers. And, further study of mathematical optimization can deliver methods, theory and application domains to the field of ML. Data mining is a field of study within ML, and focuses on exploratory data analysis through unsupervised learning. In its application across various technical business problems, ML can also be referred to as "predictive analytics".

The memory and processing resources 110 can include any number of memory elements and one or more processors (not shown in FIG. 1 for simplicity). The one or more processors can each include a processor capable of executing scripts or instructions of one or more software programs stored within associated memory resources. The one or more processors can be one or more general purpose processors that execute instructions to cause the fraud detection system 100 to perform any number of different functions or operations. In addition, or in the alternative, the one or more processors can include integrated circuits or other hardware to perform functions or operations without the use of software. In some implementations, each processor may be or include one or more microprocessors providing the processor functionality and external memory providing at least a portion of machine-readable media. In other implementations, each processor may be or include an Application Specific Integrated Circuit (ASIC) with the processor, the bus interface, the user interface, and at least a portion of the machine-readable media integrated into a single chip. In some other implementations, each processor may be or include one or more Field Programmable Gate Arrays (FPGAs) or Programmable Logic Devices (PLDs).

The memory elements can be any suitable type of memory, and can include non-volatile memory and volatile memory components. In some implementations, the memory resources can include a non-transient or non-transitory computer readable medium configured to store computer-executable instructions that can be executed by the one or more processors to perform all or a portion of one or more operations described in this disclosure.

Figure 2:
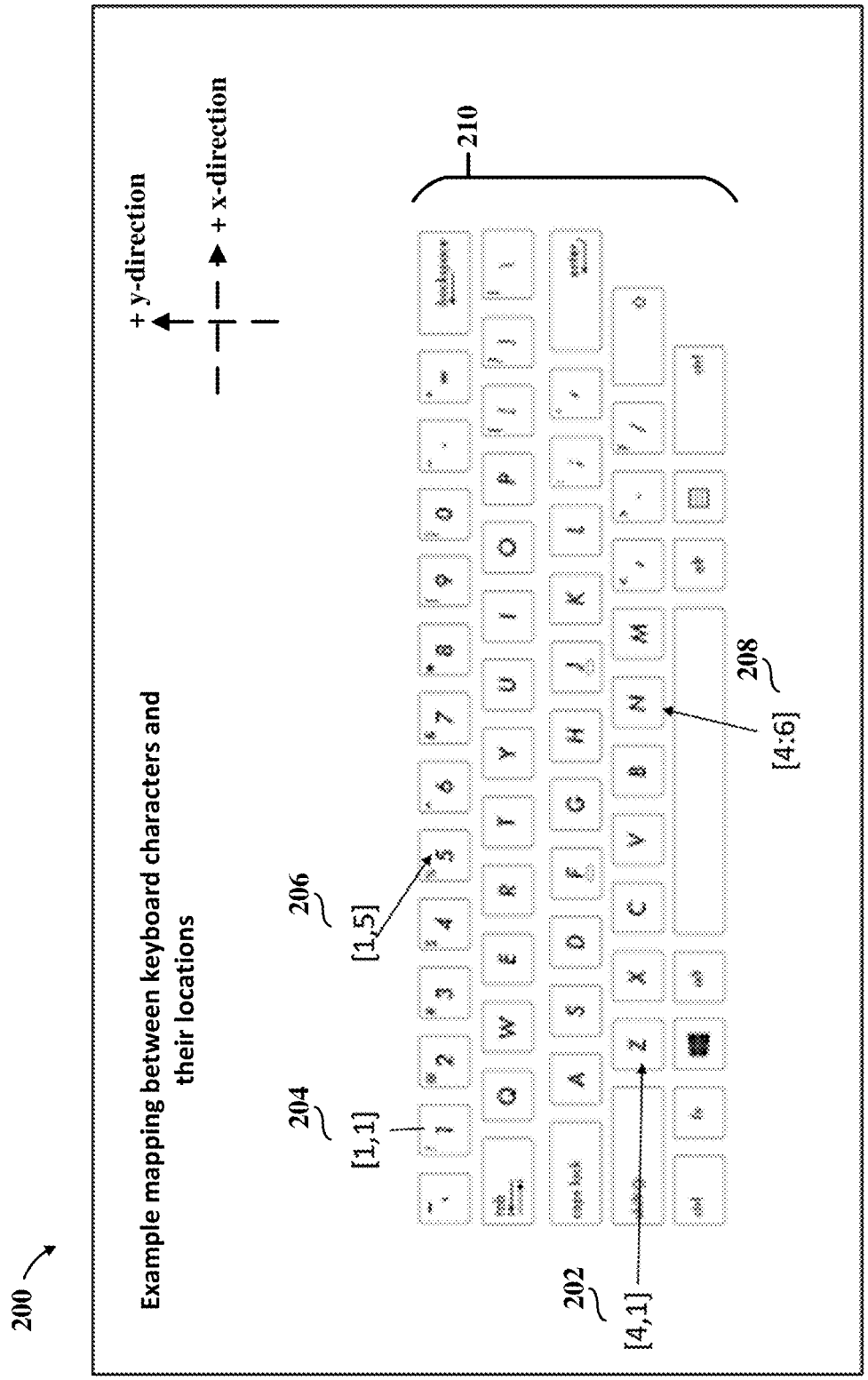
FIG. 2 shows a schematic representation of a keyboard with an example mapping of keyboard characters and their respective locations as identified on an x-y coordinate plane, according to some implementations.

FIG. 2 shows a schematic representation of an example mapping 200 of keyboard characters and their respective locations as identified on an x-y coordinate plane. The example mapping 200, which may be an example of a type of mapping applied to a virtual or actual keyboard, such as the keyboard 133, includes a keyboard layout 210 organized in the traditional "QWERTY" manner, that is having three (3) rows organized above each other, where: the first row includes the following letters: "QWERTYUIOP"; the second row includes the following letters: "ASDFGHJKL"; and, the third row includes "ZXCVBNM". Each row can, in some implementations, include additional non-letter characters in the general configuration shown in the example mapping 200, or in any other mapping.

Each alphanumeric character shown in the keyboard layout 210 can computationally be assigned an (x,y) coordinate pair, including at least the following example letters: (1) letter "z" 202 that is assigned coordinates (4,1); (2) number "1" 204 that is assigned coordinates (1,1); (3) number "5" 206 that is assigned coordinates (1,5); and, (4) letter "n" 208 that is assigned coordinates (4,1). Although depicted in a typical "QWERTY" format, the keyboard layout 210 can be configured to have any number of configurations, including those suited for languages that are significantly unlike languages that use standard Roman letters and Arabic numerals.

In some implementations, x-coordinates and y-coordinates of each character, letter, number, symbol and/or the like associated with the keyboard layout 210 can be used in subsequent operations performed by or associated with any one or more of the prefix observation engine 102, the bigram identification engine 103, the distance calculation engine 104, the distance weightage engine 105, and/or the parameter optimization engine 106, all of the fraud detection system 100.

Figure 3A:
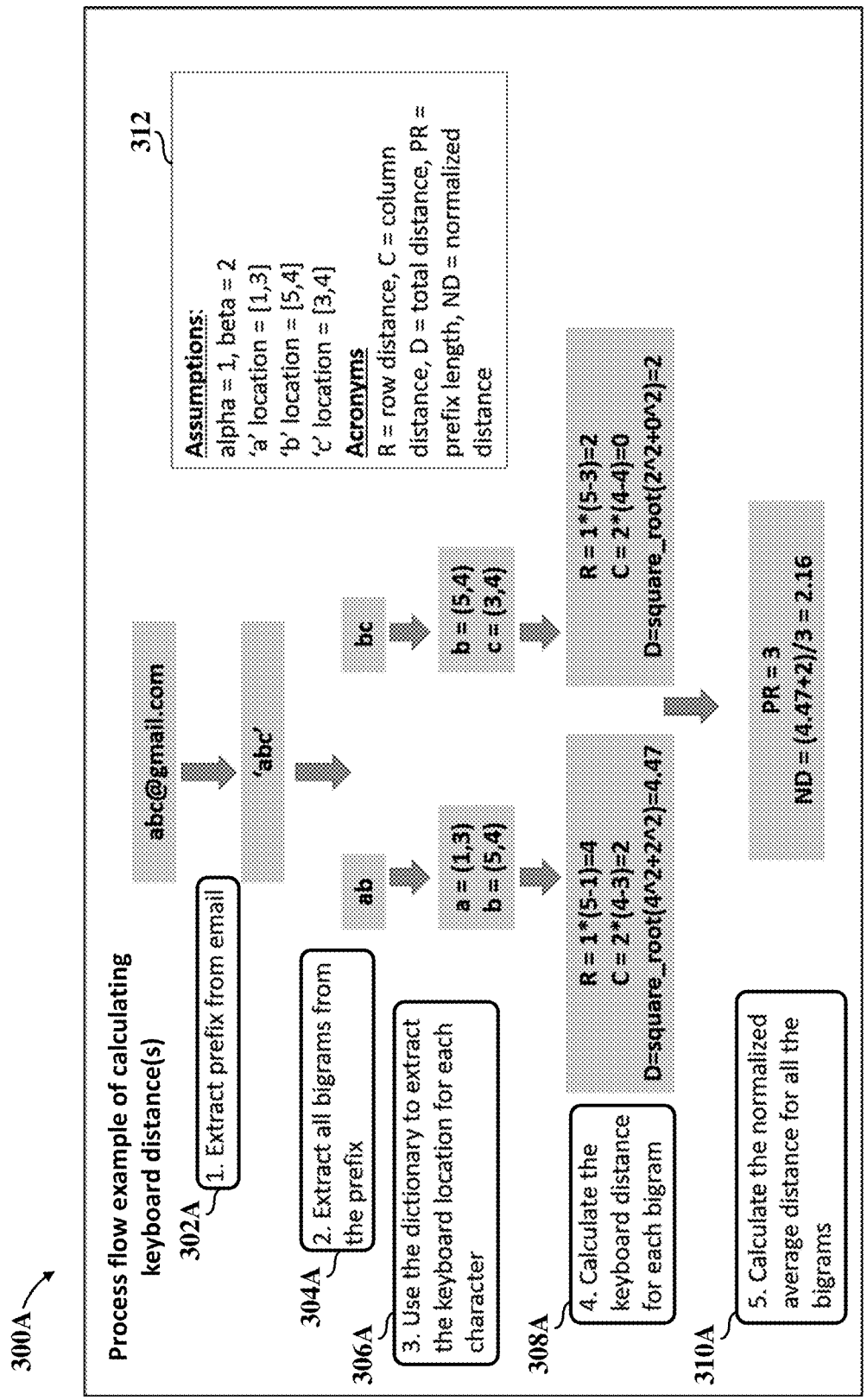
FIG. 3A shows an example process flow of calculating keyboard distances as performed by a fraud detection system, according to some implementations.

FIG. 3A shows an example process flow 300A for calculating keyboard distances, according to some implementations. The example process flow 300A shown in FIG. 3A can be executed by the fraud detection system 100 shown in FIG. 1, including the character input device 101, the prefix observation engine 102, the bigram identification engine 103, the distance calculation engine 104, the distance weightage engine 105, the parameter optimization engine 106, the memory and processing resources 110, and the incoming email address 120. The example process flow 300A can be performed by one or more processors of the fraud detection system 100. Block 312 lists several operational assumptions for the example process flow 300A, including definitions for: a first parameter (referred to as "alpha" or "α") as 1; a second parameter (referred to as "beta" or "β") as 2 (indicating that in this example, column coordinate positions are weighted at a level of twice as much as row coordinate positions); an (x,y) coordinate pair location defined for 'a' at [1,3]; an (x,y) coordinate pair location defined for 'b' at [5,4]; and, an (x,y) coordinate pair location defined for 'c' at [3,4]. Acronyms are defined as follows: "R" denotes row distance; "C" denotes column distance; "D" denotes total distance; "PR" denotes prefix length; and, "ND" denotes normalized distance.

At block 302A, the prefix observation engine 102 extracts a prefix from the incoming email address 120 (shown in FIG. 1), shown in this example as 'abc'. At block 304A, the bigram identification engine 103 extracts all bigrams (as defined earlier) from the prefix; in this example, the bigram identification engine 103 extracts two (2) bigrams, 'ab' and 'bc', from prefix 'abc' (identified as having a prefix length of three (3) characters). At block 306A, the bigram identification engine 103 can access an electronic dictionary or database (such as that shown or otherwise associated with the example mapping 200 of keyboard characters and their respective locations as identified on an x-y coordinate plane shown in FIG. 2) and extract the keyboard location for each character, consisting of the following: (1) 'a' at [1,3]; (2) 'b' at [5,4]; and, (3) 'c' at [3,4]. At block 308A, the distance calculation engine 104 calculates the keyboard distances (such as the row distance, the column distance, and the Euclidean distance) for each bigram 'i'' through a total number of bigrams 'n.' For the example of FIG. 3A, the row and column distances of the two (2) extracted bigrams 'ab' and 'bc' may be determined as indicated below:

Regarding calculation of distances for 'ab':

Row Distance for 'ab'=$R_{ab}$=α*|($x_b$-$x_a$)|=1*|(5-1)|=4      (Eq. 1)

Column Distance for 'ab'=$C_{ab}$=β*|($x_b$-$x_a$)|=2*|(4-3)|=2      (Eq. 2)

$$\text{Total Distance for 'ab'} = D_{ab} = \sqrt{R_{ab}^2 + C_{ab}^2} = \sqrt{4^2 + 2^2} \approx 4.47 \quad \text{(Eq. 3)}$$

Regarding calculation of distances for 'bc':

Row Distance for 'bc'=$R_{bc}$=α*|($x_c$-$x_b$)|=1*|(3-5)|=4      (Eq. 4)

Column Distance for 'bc'=$C_{bc}$=β*|($x_c$-$x_b$)|=2*|(4-4)|=2      (Eq. 5)

$$\text{Total Distance for 'bc'} = D_{bc} = \sqrt{R_{bc}^2 + C_{bc}^2} = \sqrt{2^2 + 0^2} = 2 \quad \text{(Eq. 6)}$$

At block 310A, the distance calculation engine 104 calculates the normalized average distance (ND) for all the bigrams, such as 'ab' and 'bc' in this example, by the following formula:

Prefix Length=$PR_{abc}$=3      (Eq. 7)

Norm. Dist.=$ND_{abc}$=$\Sigma_{i=1}^{n} D_i$=($D_{ab}$+$D_{bc}$)/$PR_{abc}$= (4.47+2)/3≈2.16      (Eq. 8)

In some implementations, the distance calculation engine 104 of the example process flow 300A can compare the normalized distance with a value (such as a pre-defined threshold value) for classification of the email address as suspicious or as not suspicious based at least in part on the comparing. More specifically, classifying the email address can include: (1) classifying the email address as suspicious when the normalized distance is less than the value; and (2) classifying the email address as not suspicious when the normalized distance is not less than the value (such as being greater than or equal to the value).

Figure 3B:
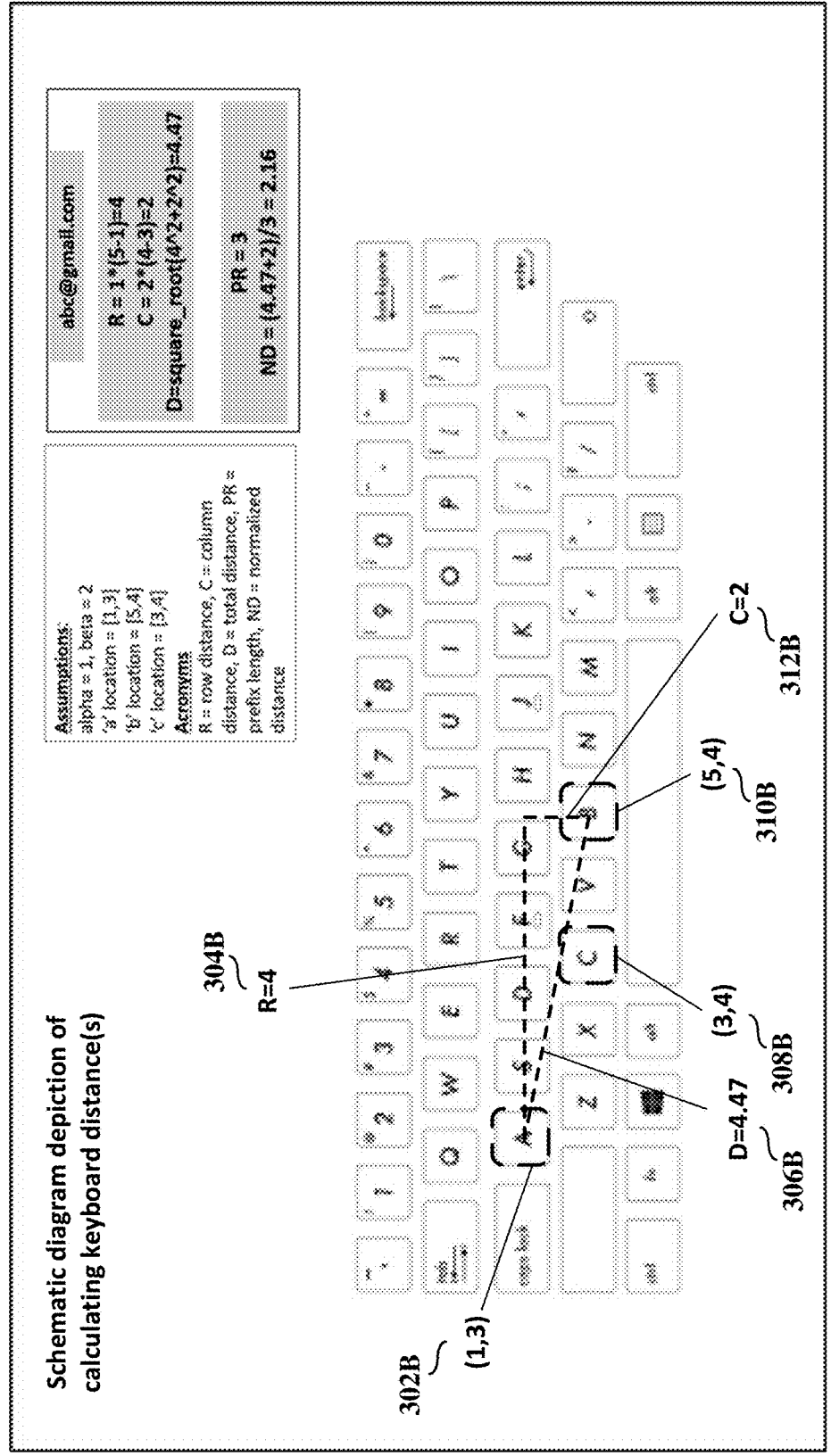
FIG. 3B shows a schematic diagram depiction of calculating keyboard distances, according to some implementations.

FIG. 3B shows a schematic diagram 300B depicting the calculation of keyboard distances, according to some implementations. In this example, a visual depiction is shown on an example "QWERTY" type keyboard for the bigram 'ab' of the 'abc' prefix of the example process flow 300A. Letter 'a' is at position 302B (1,3); letter 'b' is at position 310B (5,4); and, letter 'c' is at position 308B (3,4). A row distance 304B of four (4) and a column distance 312B of two (2) are shown between letters 'b' and 'a' at positions 310B and 302B, respectively, and calculate a keyboard distance 306B of approximately 4.47. Such a distance, in some implementations, may exceed a threshold value, thus resulting in the example process flow 300A shown in FIG. 3A yielding a determination of 'not suspicious,' which may be the case for legitimate email addresses including actual names such as the name "Abraham" in an example legitimate email address of "Abraham.Smith@gmail.com".

FIG. 4 shows an illustration 400 depicting ascertaining the accuracy of determining fraudulent email addresses, according to some implementations. The illustration 400 may include the example synthetic email address 402 ("gfdghhf@gmail.com", with a prefix "gfdghhf"), a table 404 of synthetic email address listed by average key distance score (such as normalized distance), and a box-and-whisker plot 406 comparing the various key distance scores shown in the table 404 with a value 408 to categorize the example synthetic email addresses into a "false" classification (denoting synthetic email addresses) or a "true" classification (denoting legitimate email addresses). In some implementations, the comparison may result in an email address risk score at a definite precision level, such as 84%.

Figure 5:
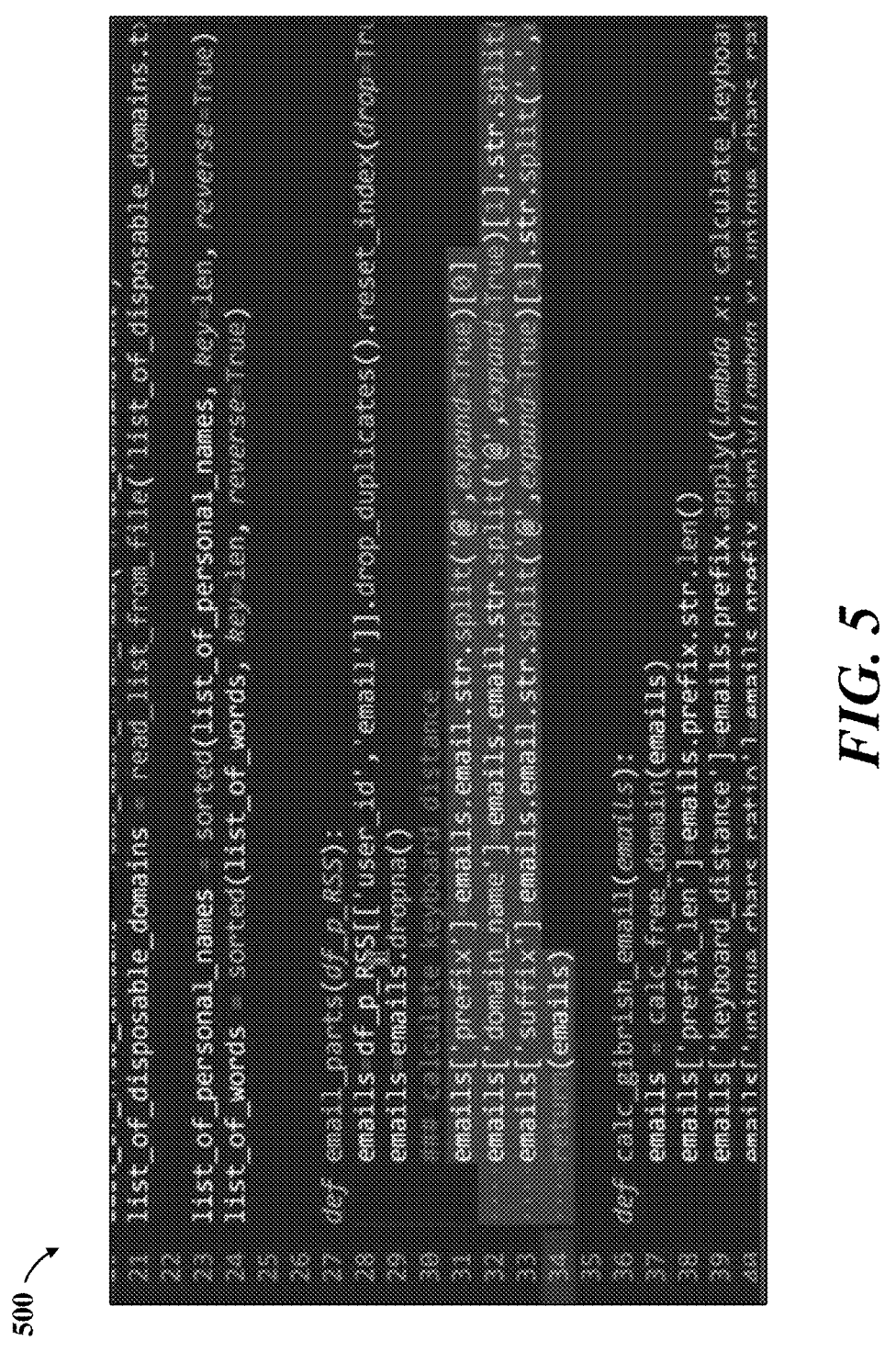

FIG. 5 shows an example representation 500 of a fraud detection system as encoded in Python programming language, according to some implementations. Python is an interpreted, high-level, general-purpose programming language. Python's design philosophy generally emphasizes code readability with its notable use of significant whitespace. Its language constructs and object-oriented approach help programmers write clear, logical code for small and large-scale projects. In some implementations, any one or more of the various systems, processes, and associated computer hardware and/or software associated with fraud detection system 100 may be at least partially implemented in the Python programming language, or other computer programming languages.

Figure 6A:
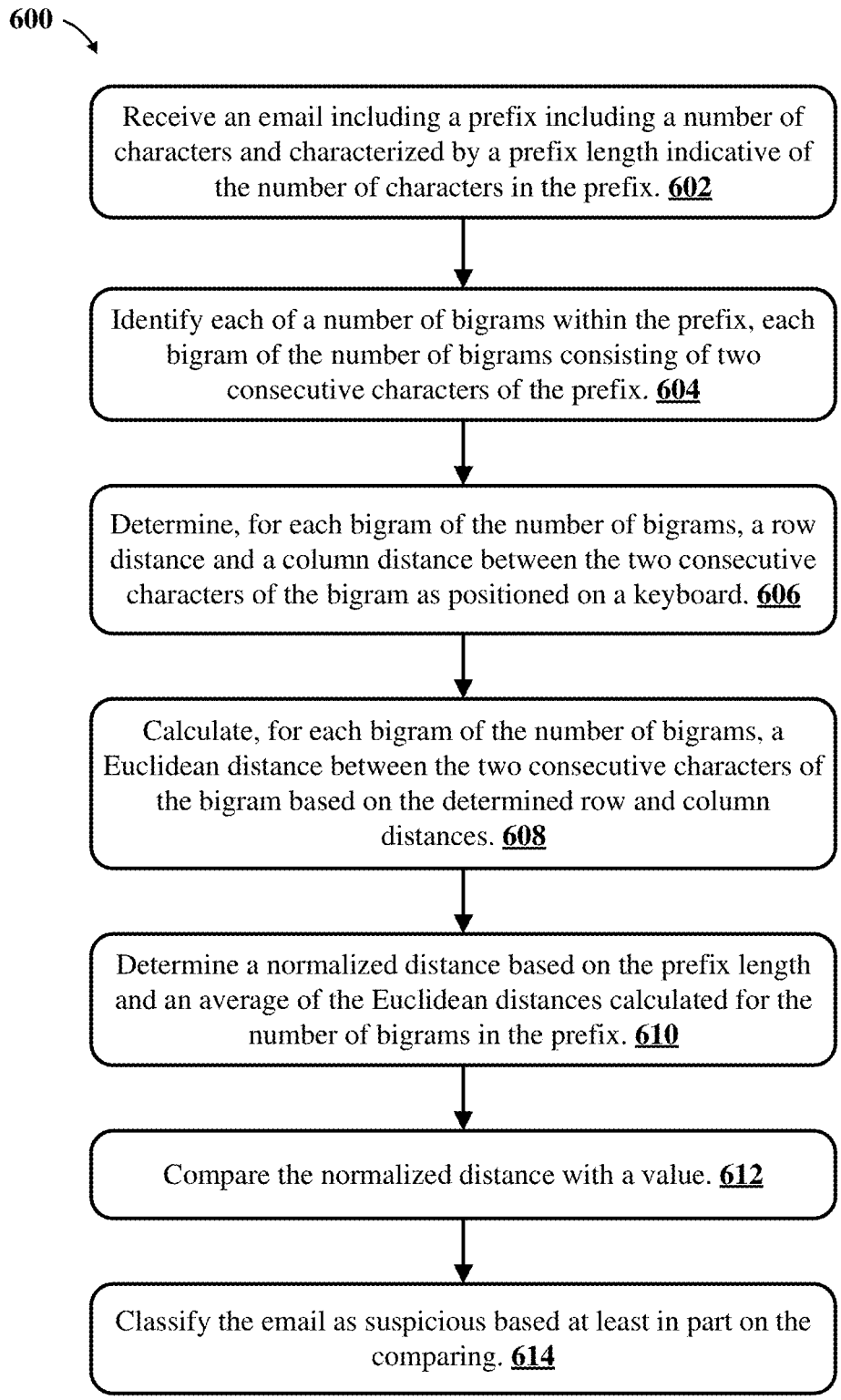

FIG. 6A shows an illustrative flowchart depicting an example operation 600 for identifying fraudulent email addresses associated with an electronic payment service, according to some implementations. The operation 600 may be performed by one or more processors of the fraud detection system 100 of FIG. 1. At block 602, the fraud detection system 100 receives an email including a prefix including a number of characters and characterized by a prefix length indicative of the number of characters in the prefix. At block 604, the fraud detection system 100 identifies each of a number of bigrams within the prefix, each bigram of the number of bigrams consisting of two consecutive characters of the prefix. At block 606, the fraud detection system 100 determines, for each bigram of the number of bigrams, a row distance and a column distance between the two consecutive characters of the bigram as positioned on a keyboard. At block 608, the fraud detection system 100 calculates, for each bigram of the number of bigrams, a Euclidean distance between the two consecutive characters of the bigram based on the determined row and column distances. At block 610, the fraud detection system 100 determines a normalized distance based on the prefix length and an average of the Euclidean distances calculated for the number of bigrams in the prefix. At block 612, the fraud detection system 100 compares the normalized distance with a value. At block 614, the fraud detection system 100 classifies the email as suspicious based at least in part on the comparing.

FIG. 6B shows an illustrative flowchart depicting an example operation 620 for email classification. The operation 620 may be performed by one or more processors of the fraud detection system 100 of FIG. 1. At block 626, the fraud detection system 100 classifies the email as suspicious when the normalized distance is less than the value. At block 628, the fraud detection system 100 classifies the email as not suspicious when the normalized distance is not less than the value.

FIG. 6C shows an illustrative flowchart depicting an example operation 630 for assigning coordinates for characters. The operation 630 may be performed by one or more processors of the fraud detection system 100 of FIG. 1. At block 632, the fraud detection system 100, for each bigram of the number of bigrams, assigns an x-coordinate and a y-coordinate for each of the two consecutive characters in the bigram.

FIG. 6D shows an illustrative flowchart depicting an example operation 640 for calculating distances. The operation 640 may be performed by one or more processors of the fraud detection system 100 of FIG. 1. At block 642, the fraud detection system 100 calculates the row distance between the two consecutive characters of a respective bigram based on a difference between absolute values of the x-coordinates of the two consecutive characters of the respective bigram. At block 644, the fraud detection system 100 calculates the column distance between the two consecutive characters of the respective bigram based on a difference between absolute values of the y-coordinates of the two consecutive characters of the respective bigram.

FIG. 6E shows an illustrative flowchart depicting an example operation 650 for creating a mapping. The operation 650 may be performed by one or more processors of the fraud detection system 100 of FIG. 1. At block 652, the fraud detection system 100 creates a mapping between each of the characters in the prefix and a corresponding set of the x-coordinates and the y-coordinates.

FIG. 6F shows an illustrative flowchart depicting an example operation 660 for determining weighted distances. The operation 660 may be performed by one or more processors of the fraud detection system 100 of FIG. 1. At block 662, the fraud detection system 100 determines a weighted row distance by multiplying the row distance of the bigram by a first parameter. At block 664, the fraud detection system 100 determine a weighted column distance by multiplying the column distance of the bigram by a second parameter, wherein the Euclidean distance of the bigram is based on the weighted row distance, the weighted column distance, and the prefix length.

FIG. 6G shows an illustrative flowchart depicting an example operation 670 for calculating the Euclidean distance. The operation 670 may be performed by one or more processors of the fraud detection system 100 of FIG. 1. At block 672, the fraud detection system 100 calculates the Euclidean distance by taking a square root of a distance value based on a sum of the weighted row distance squared and the weighted column distance squared.

FIG. 6H shows an illustrative flowchart depicting an example operation 680 for optimizing parameters using machine learning (ML). The operation 660 may be performed by one or more processors of the fraud detection system 100 of FIG. 1. At block 682, the fraud detection system 100 iteratively optimizes the first and second parameters using a machine learning (ML) classification model. At block 684, the fraud detection system 100 infers a fraud level of the email based at least in part on the first and second optimized parameters.

Figure 7:
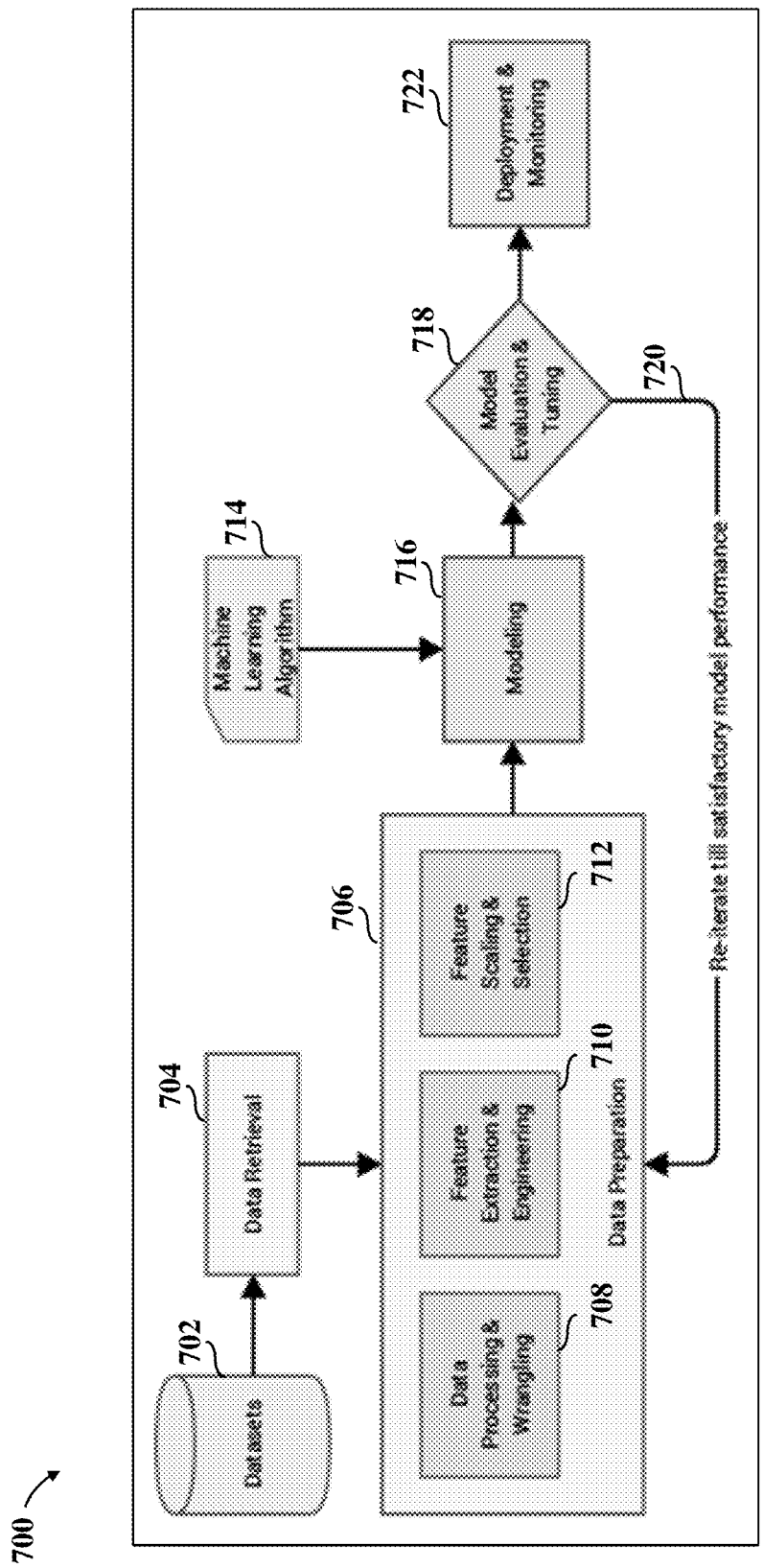
FIG. 7 shows a machine learning (ML) classification model for optimizing parameters that can be used in a fraud detection system, according to some implementations.

FIG. 7 shows a ML classification model 700 for optimizing parameters for use with the fraud detection system 100 or other fraud detection systems, according to some implementations. ML, generally, implies a subfield of computer science that is concerned with building algorithms, which rely on a collection of examples of some (naturally occurring, or artificially created) phenomenon. These examples can also (or alternatively) be generated by another algorithm. ML can also be defined as the process of solving a practical problem by, for example: (1) gathering a dataset; and, (2) algorithmically building a statistical model based on that dataset, which can solve the practical problem. ML includes various types of learning, including: (1) supervised; (2) semi-supervised; (3) unsupervised; and, (4) reinforcement. The ML classification model 700 may take the form of an extensible data structure that can represent sets of words or phrases and/or can be used for representing sets of features or signatures.

The ML classification model 700 may be seeded with a large volume of raw email address related data and indications of malware or other malicious code within the raw data, and then trained for "learning" a set of features and detect or identify the malware or other malicious code or benign code in known traffic flows. Once trained (with or without supervision), the ML classification model 700 may apply the learned sets of features to unknown traffic flows and infer whether the unknown traffic flows contain malware or other malicious code or benign data.

The ML classification model 700, in some implementations, can address issues or problems related to tasks performed by the fraud detection system 100, including the receipt, recognition, and filtration of emails into classifications such as fraudulent or legitimate based on calculated keyboard-related metrics. More particularly, the ML classification model 700 can consider large quantities of datasets 702, each dataset having many email addresses, and observe patterns occurring within each email dataset as well as across separate datasets for iteratively optimizing, as shown in at least block 312 of FIG. 3A, a first parameter (referred to as "alpha" or "α") relating to row distance calculations and/or a second parameter (referred to as "beta" or "β") relating to column distance calculations, both parameters being capable of adjusting relative weightages (referring to the extent or proportion of contribution) of each the parameters to target particular keyboard character clustering patterns and related distance calculations. For example, certain datasets may demonstrate a higher concentration of letter or character occurrences across the same row, whereas other datasets may demonstrate a higher concentration of letter or character occurrences across the same column, each dataset being able to be addressed by the ML classification model 700 to either amplify or diminish the significance of row or column distances by the first and second parameter, respectively.

In some implementations, the ML classification model 700 can be considered to be a "standard pipeline" and adjusted to address the needs of any potential data science related issue, and includes the datasets 702, a data retrieval engine 704, a data preparation engine 706 (including a data processing and wrangling engine 708, a feature extraction and engineering engine 710, and a feature scaling and selection engine 712), a ML algorithm 714, a modeling engine 716, a model evaluation and tuning engine 718, a re-iterate till satisfactory model performance loop 720, and a deployment and monitoring engine 722. Generally, the ML classification model 700 can clean and structure incoming email data (such as from the datasets 702), perform an exploratory data analysis, develop a set of features. The ML classification model 700 may run independently, or may include multiple or partial additions of one or more additional ML models, any one or more being at least partially coded in the Python programming language, include performing hyper-parameter tuning and optimize a desirable variant of the ML classification model, and include capabilities directed to evaluation of its performance on a test set.

The ML classification model 700 can, in some aspects, operate by receiving the datasets 702, any one or more of the datasets 702 including incoming email 120 (as shown in FIG. 1) with at least some synthetic email addresses dispersed within a population of legitimate email addresses, or solely consist of synthetic email addresses. The data retrieval engine 704 can intake any combination of synthetic and/or legitimate email addresses for further manipulation by the data preparation engine 706, which can include any one or more data extraction, manipulation, and/or cleaning (such as the removal or filtration of unwanted data) by any one or more of the data processing and wrangling engine 708, the feature extraction and engineering engine 710, and the feature scaling and selection engine 712, before supplying the processed or manipulated data relating to synthetic and/or legitimate email addresses to the modeling engine 716.

The ML algorithm 714 can include one or more ML algorithms 714 included in the group of decision trees, random forest, logistic regression, nearest neighbors, classification trees, control flow graphs, support vector machines, naïve bayes, Bayesian Networks, value sets, hidden Markov models, and neural networks to potentially further manipulate incoming data relating to synthetic and/or legitimate email addresses prior to evaluation by the model evaluation and tuning engine 718, which can be configured to evaluate overall performance (such as that measured by timeliness, throughput, and accuracy) of the ML classification model 700 prior to deployment by the deployment and monitoring engine 722.

Upon deployment, the ML classification model can optimize any one or more of the first parameter (referred to as "alpha" or "α") relating to row distance calculations and/or the second parameter (referred to as "beta" or "β") relating to column distance calculations to yield desirable outcomes regarding the reliable classification of email addresses as either fraudulent or legitimate. Implementation of such adjustable parameters in the fraud detection system 100 and/or the ML classification model 700 as at least partially implemented by any one or more of the distance weightage engine 105 and/or the parameter optimization engine 106 of the fraud detection system 100 as shown in FIG. 1 can address issues occasionally observed in synthetic emails. For example, the ML algorithms 714 can avoid giving the same weightage or importance to letters occurring in the same row of the keyboard, in view of the (digital) observation that repeat usages of such letters are likely an indication of a synthetic email address, as real-life human names may show additional variance between the three rows of a traditional QWERTY keyboard.

Such fine-tuning of the ML algorithm 714 can consider that random typing on keyboard (such as with the same hand) can result in typing on the same row, as the human hand (on conventional keyboard layouts) may result circumstances where human users are less likely to hit a letter on the same column but on a lower or higher row, etc. Accordingly, the ML algorithm 714 can give additional weight to the distance between, for example, "G" and "B" which are physically or geometrically closer to one another being on the same column, rather than "G" and "H", as (in this example) transitioning across the column may correlate with the prevalence of a legitimate email address.

In some implementations, each letter, character, or symbol on a keyboard (such as example mapping 200 of keyboard characters and their respective locations as identified on an x-y coordinate plane) as associated with fraud detection system 100 is not attributed an inherent weight (and are thus only identified by their position as established by an (x,y) coordinate pair). Optimization of the α and β parameters by application of the ML classification model including the ML algorithm 714 can, in some implementations, more effectively discern synthetic from legitimate email addresses. The ML algorithm 714 can decide what parameter (out of "α" and "β") should be given a higher weight responsively adjust values and block synthetic email addresses, as "α" and "β" can have a significant impact on the normalized distance. In some aspects, "α" can be less than 1, as well as "β".

ML related processes can be data-driven, thus requiring great amounts of data is required for ML algorithms for making accurate predictions tailored for individual end-use conditions. Accordingly, the ML classification model 700 can be retrained to address and respond to different and new synthetic email attacks, on an attack-by-attack basis, and/or adjusting for variance in synthetic email patterns compared to real-life human email address names, etc.

ML classification model 700 and/or ML algorithms 714 can be optimized and identify specific expected synthetic email attacks. In such circumstances, "α" and "β" need not necessarily change, but they may change. The high volume of synthetic emails received by electronic payment service providers can be directed to sabotage servers to disrupt customer service capabilities. normalized distance calculations can be optimized according to optimized "α" and "β" parameters to efficiently block what is expected to be a synthetic email.

In some implementations, electronic payment service provers can use data provided by the ML classification model 700 and send a follow-up communication (via email), or provide a CAPTCHA type identity verification, and further ascertain the identity of an email originator (to determine whether the email originated from a human or from a digital or synthetic source.) In the alternative, or in addition, the ML classification model 700 can include capabilities directed ascertaining whether a given prefix of the incoming email 120 include a personal name, is a disposable domain, or if it's a free domain. Therefore, the ML classification model 700 can identify and thus recognize what is authentic and what is not (such as Gmail, work email domains, and others as authentic). In comparison, fake email domains often times are alphanumeric gibberish which can also be detected by the ML classification model 700.

As used herein, a phrase referring to "at least one of" or "one or more of" a list of items refers to any combination of those items, including single members. For example, "at least one of: a, b, or c" is intended to cover the possibilities of: "a" only, "b" only, "c" only, a combination of "a" and "b", a combination of "a" and "c", a combination of "b" and "c", and a combination of "a" and "b" and "c".

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method of identifying fraudulent emails, the method performed by one or more processors of a computing device and comprising:
   receiving an email comprising a prefix including a number of characters and characterized by a prefix length indicative of the number of characters in the prefix;
   identifying each of a number of bigrams within the prefix, each bigram of the number of bigrams consisting of two consecutive characters of the prefix;
   determining, for the each bigram of the number of bigrams, a row distance and a column distance between the two consecutive characters of the each bigram as positioned on a keyboard;
   calculating, for the each bigram of the number of bigrams, an Euclidean distance between the two consecutive characters of the each bigram based on the determined row and column distances;
   determining a normalized distance based on the prefix length and an average of the Euclidean distances calculated for the number of bigrams in the prefix;
   comparing the normalized distance with a value; and
   classifying the email as suspicious or as not suspicious based at least in part on the comparing.

2. The method of claim 1, wherein classifying the email comprises:
   classifying the email as suspicious when the normalized distance is less than the value; and
   classifying the email as not suspicious when the normalized distance is not less than the value.

3. The method of claim 1, further comprising:
   for the each bigram of the number of bigrams, assigning a x-coordinate and a y-coordinate to each of the two consecutive characters in the each bigram.

4. The method of claim 3, further comprising:
   calculating the row distance between the two consecutive characters of a respective bigram based on a difference between absolute values of the x-coordinates of the two consecutive characters of the respective bigram; and
   calculating the column distance between the two consecutive characters of the respective bigram based on a difference between absolute values of the y-coordinates of the two consecutive characters of the respective bigram.

5. The method of claim 3, further comprising:
   creating a mapping between each of the characters in the prefix and a corresponding set of x-coordinates and y-coordinates.

6. The method of claim 1, further comprising, for the each bigram:
   determining a weighted row distance by multiplying the row distance of the each bigram by a first parameter; and
   determining a weighted column distance by multiplying the column distance of the each bigram by a second parameter, wherein the Euclidean distance of the each bigram is based on the weighted row distance, the weighted column distance, and the prefix length.

7. The method of claim 6, wherein the Euclidean distance is calculated by taking a square root of a distance value based on a sum of the weighted row distance squared and the weighted column distance squared.

8. The method of claim 6, further comprising:
   iteratively optimizing the first and second parameters using a machine learning classification model.

9. The method of claim 8, further comprising:
   inferring a fraud level of the email based at least in part on the first and second optimized parameters.

10. The method of claim 8, wherein the machine learning classification model is based on at least one of a decision tree or a logistic regression.

11. A computing device for identifying fraudulent emails addresses, the computing device comprising:
    one or more processors; and
    a memory coupled to the one or more processors and storing instructions that, when executed by the one or more processors, cause the computing device to perform operations comprising:
       receiving an email comprising a prefix including a number of characters and characterized by a prefix length indicative of the number of characters in the prefix;
       identifying each of a number of bigrams within the prefix, each bigram of the number of bigrams consisting of two consecutive characters of the prefix;
       determining, for the each bigram of the number of bigrams, a row distance and a column distance between the two consecutive characters of the each bigram as positioned on a keyboard;
       calculating, for the each bigram of the number of bigrams, an Euclidean distance between the two consecutive characters of the each bigram based on the determined row and column distances;
determining a normalized distance based on the prefix length and an average of the Euclidean distances calculated for the number of bigrams in the prefix;
comparing the normalized distance with a value; and
classifying the email as suspicious or as not suspicious based at least in part on the comparing.

12. The computing device of claim 11, wherein execution of the instructions for classifying the email causes the computing device to perform operations further comprising:
classifying the email as suspicious when the normalized distance is less than the value; and
classifying the email as not suspicious when the normalized distance is not less than the value.

13. The computing device of claim 11, wherein execution of the instructions causes the computing device to perform operations further comprising:
for the each bigram of the number of bigrams, assigning a x-coordinate and a y-coordinate to each of the two consecutive characters in the each bigram.

14. The computing device of claim 13, wherein execution of the instructions causes the computing device to perform operations further comprising:
calculating the row distance between the two consecutive characters of a respective bigram based on a difference between absolute values of the x-coordinates of the two consecutive characters of the respective bigram; and
calculating the column distance between the two consecutive characters of the respective bigram based on a difference between absolute values of the y-coordinates of the two consecutive characters of the respective bigram.

15. The computing device of claim 13, wherein execution of the instructions causes the computing device to perform operations further comprising:
creating a mapping between each of the characters in the prefix and a corresponding set of x-coordinates and y-coordinates.

16. The computing device of claim 11, wherein execution of the instructions causes the computing device to perform operations further comprising, for each bigram:
determining a weighted row distance by multiplying the row distance of the each bigram by a first parameter; and
determining a weighted column distance by multiplying the column distance of the each bigram by a second parameter, wherein the Euclidean distance of the each bigram is based on the weighted row distance, the weighted column distance, and the prefix length.

17. The computing device of claim 16, wherein the Euclidean distance is calculated by taking a square root of a distance value based on a sum of the weighted row distance squared and the weighted column distance squared.

18. The computing device of claim 16, wherein execution of the instructions causes the computing device to perform operations further comprising:
iteratively optimizing the first and second parameters using a machine learning classification model.

19. The computing device of claim 18, wherein execution of the instructions causes the computing device to perform operations further comprising:
inferring a fraud level of the email based at least in part on the first and second optimized parameters.

20. The computing device of claim 18, wherein the machine learning classification model is based on at least one of a decision tree or a logistic regression.

* * * * *